United States Patent Office 2,936,290
Patented May 10, 1960

2,936,290
OXIDIZABLE ORGANIC COMPOSITIONS STABILIZED WITH HYDROGENATED PYRAZOLES

Hermann Gysling, Riehen, near Basel, and Hans Jakob Peterli, Munchenstein, Basel Land, Switzerland, assignors to J. R. Geigy A.-G., Basel, Switzerland No Drawing. Application June 9, 1958
Serial No. 740,542

Claims priority, application Switzerland June 14, 1957

6 Claims. (Cl. 252—401)

The present invention concerns a process for the stabilising of sensitive substances. In particular it concerns the protection of organic substances which are sensitive to oxygen or oxidation from the effect of oxygen and from the action of addition products thereof on organic substances.

It has been found that organic substances which are sensitive to oxygen or oxidation can be protected from the decomposing action of oxygen or from oxidation or the effects thereof can be greatly retarded if a slight amount of hydrogenated pyrazoles, aryl substituted in the 1-position, wherein the aryl radical may be possibly further substituted, is added to these substances. These compounds correspond to the general Formulae I and II:

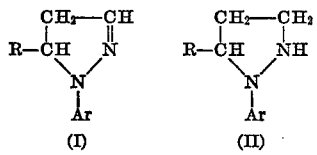

wherein Ar represents an aryl radical and R represents an alkyl radical or hydrogen.

Examples of organic substances which are sensitive to oxygen or oxidation and which can be stabilised according to the present invention are hydrocarbons, in particular mineral oils, fats, fatty oils, waxes, ether, aldehydes and all compounds which contain unsaturated organic groupings, in particular also fatty acids and derivatives thereof as well as polymers containing unsaturated organic groupings or in which such groupings can easily occur.

In the protective agents of the general Formulae I and II, Ar represents chiefly a phenyl radical. This aryl radical is preferably not further substituted. It can contain however, non-ionogenic substituents in particular aliphatic groups such as the methyl, ethyl, tert. butyl, tert. pentyl, iso-octyl, dodecyl groups and also ether groups such as methoxy or ethoxy groups, or halogens such as fluorine, chlorine, bromine, iodine.

In the above formulae, R advantageously represents a lower alkyl radical having 1–4 C atoms, in particular the methyl radical.

Small amounts of the protective agents are incorporated into the substances to be protected, for example in amounts of 0.001 to 1.0% of the carrier, the best way of distributing them being dissolving them at usual or raised temperatures.

1-phenyl pyrazolines aliphatically substituted in the 3- and 5-positions have already been suggested for stabilising turbine oils. Compared with these 1-phenyl pyrazolines used up to now, those used according to the present invention surprisingly have a much better and more long lasting action. This improvement is all the more unobvious as, in the known compounds, the breakdown of higher side chains leads to less active compounds.

The anti-oxidative effect of the compounds according to the present invention is considerably reduced if they are substituted in the 3-position, so that it is important that the 3-position remains unsubstituted.

The following examples illustrate the action of the 1-aryl-pyrazolines or 1-aryl pyrazolidines used according to the present invention. Where not otherwise stated, parts are given as parts by weight. The temperatures are given in degrees centigrade. The relationship of parts by weight to parts by volume is as that of grammes to cubic centimetres.

EXAMPLE 1

Stabilisation of aldehydes

*Experimental procedure.*—0.002 g. of each of the following stabilisers are added to 20 g. of freshly distilled enanthol and each mixture, in a shaking vessel connected with a gas measuring tube, is subjected to the action of oxygen. The take-up of $O_2$ is continuously registered. Table I shows the result of this test.

TABLE I

| Inhibitor | take-up of $O_2$ in ccm. | | | |
|---|---|---|---|---|
| | 5 hrs. | 10 hrs. | 20 hrs. | 50 hrs. |
| none | 100 | | | |
| hydroquinone 0.01% | 3 | 7 | 15 | 55 |
| 1-phenyl-3.5.5-trimethylpyrazoline 0.01% | 60 | 100 | | |
| 1-phenyl-3-isobutenyl-5.5-dimethyl-pyrazoline 0.01% | 6 | 12 | 26 | 100 |
| 1-phenylpyrazoline 0.01% | 2 | 3 | 6 | 12 |
| 1-phenylpyrazolidine 0.01% | 2 | 2 | 5 | 10 |
| 1-(o-methoxy-phenyl)-pyrazoline, 0.01% | 3 | 4 | 8 | 13 |
| 1-(m-chlorophenyl)-pyrazoline, 0.01% | 3 | 5 | 10 | 13 |
| 1-p-tolyl-pyrazolidine 0.01% | 3 | 4 | 7 | 13 |
| 1-p-tert.butyl-phenylpyrazoline 0.01% | 2 | 3 | 7 | 13 |
| 1-p-tert.butyl-phenyl-pyrazolidine 0.01% | 2 | 2 | 6 | 11 |

The test shows that in concentrations of 0.01% the 1-phenylpyrazoline or -pyrazolidine more effectively hinders the take-up of oxygen than the stabilisers known in the state of the art.

It is also remarkable that 3-isobutenyl-5.5-dimethyl-1-phenyl-pyrazoline is considerably more effective than 3-methyl-5.5-dimethyl-1-phenyl-pyrazoline. It is, therefore, completely unexpected that 1-phenyl-pyrazoline again shows a better action than the trimethyl-pyrazoline and even that its action is more than 10 times that of 3-isobutenyl-5.5-dimethyl-1-phenyl-pyrazoline.

EXAMPLE 2

Hindering of the peroxide formation in hydrogenated cycles

The action of the stabilisers with regard to the hindering of peroxide formation in tetrahydronaphthalene in the presence of oxygen is tested with the apparatus described above. 0.02% of each of the inhibitors mentioned below are mixed with 20 g. of tetrahydronaphthalene and each of the mixtures is shaken for 30 hours in an $O_2$ atmosphere. After this time, the peroxide formed in each case is determined according to the method of Wagner, Smith & Peters (Anal. Chem. 19, 976 (1947)).

In Table 2, the amount of n/10 thiosulphate solution needed with the determination method mentioned is taken as the measure of the peroxide formation.

TABLE 2

| stabiliser | amount of n/10 thiosulphate needed, ccm. |
|---|---|
| none | 12.0 |
| none | 14.1 |
| hydroquinone | 0.52 |
| 1-phenylpyrazoline | 0.24 |
| 3-methyl-5.5-dimethyl-1-phenylpyrazoline | 9.82 |
| 3-isobutenyl-5.5-dimethyl-1-phenylpyrazoline | 9.18 |

This test also shows that 1-phenylpyrazoline is much more effective than the two compounds further substituted in the pyrazoline ring.

EXAMPLE 3

*Hindering of the peroxide formation in ethers*

0.01% of each of the following stabilisers are added to tetrahydrofurane and each mixture is left to stand in half filled flasks. The peroxide formed is determined by the method described in Example 2. Table 3 shows the result of these tests.

TABLE 3

| stabiliser | amount of n/10 thiosulphate needed per 10 c.c.m. tetrahydrofurane, ccm. |
|---|---|
| none | 115.0 |
| hydroquinone | 1.0 |
| 1-phenylpyrazoline | 0.2 |
| 1-phenyl-3-methyl-5.5-dimethylpyrazoline | 10.0 |
| 1-phenyl-3-isobutenyl-5.5-dimethylpyrazoline | 8.2 |

EXAMPLE 4

*Retardation of oxidation of lubricating oil*

*Test method.*—"Continental Oil Test" according to Ind. & Eng. Chemistry, vol. 33, page 339 (1941).

13 ccm. of "Regal Oil B" of Messrs Texas Co. are exposed to an oxygen atmosphere in an apparatus without mechanical movement as described in the cited article. The take-up of $O_2$ is determined by measuring the drop in pressure in an Hg manometer connected with the apparatus. The time taken until the drop in pressure reaches 60 mm. Hg is regarded as the criterion for the stability of the oil. Test conditions:

0.05% of copper naphthenate as oxidation catalyst and 0.5% of bis-salicylal-1.2-propylene diamine ("Du Pont metal deactivator") are added to "Regal Oil B" and the whole is subjected to the test at 115° C.

A sample of this oil which in addition contains 0.25% of 1-phenylpyrazoline or 1-phenylpyrazolidine as anti-oxidant is subjected to the same test simultaneously.

The stabilities measured were:

|  | Hours |
|---|---|
| Without 1-phenylpyrazoline | 50 |
| With 1-phenyl-pyrazoline | 195 |
| With 1-phenylpyrazolidine | 155 |

Thus, 1-phenylpyrazoline as well as 1-phenylpyrazolidine also proved to be more effective stabilisers for the mineral oil.

EXAMPLE 5

*Stabilisation of aldehydes*

*Test method.*—0.002 g. of each of the following stabilisers are added to 20 g. of freshly distilled nonaldehyde and each mixture, in a shaking vessel connected with a gas measuring tube, is subjected to the action of oxygen. The take-up of $O_2$ is continuously registered. Table 5 shows the result of this test:

TABLE 5

| Inhibitor | take-up of $O_2$ in ccm. | | | |
|---|---|---|---|---|
|  | 20 hrs. | 40 hrs. | 135 hrs. | 160 hrs. |
| hydroquinone | 32 | 50 | 90 | 100 |
| 1-phenyl-5-methyl-pyrazoline | 2 | 2 | 12 | 24 |
| 1-phenyl-3-methyl-pyrazoline | 2 | 50 | 100 | 100 |
| 1-phenyl-5-methyl-pyrazolidine | 2 | 3 | 10 | 20 |

The test shows that, in concentrations of 0.01%, the 1-phenyl-5-methylpyrazoline or -pyrazolidine used according to the present invention more effectively hinder the take-up of oxygen than the other inhibitors mentioned.

What we claim is:

1. A normally oxidisable organic material selected from the group consisting of hydrocarbons, aldehydes and cyclic ethers stabilised with a compound of one of the formulae:

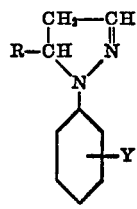

and

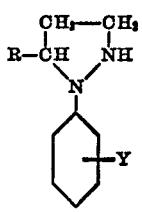

wherein

R represents a member selected from the group consisting of hydrogen and a lower alkyl radical, and Y represents a member selected from the group consisting of hydrogen, halogen, alkyl and lower alkoxy groups.

2. A normally oxidisable organic material selected from the group consisting of hydrocarbons, aldehydes and cyclic ethers stabilised with 1-phenyl-pyrazoline.

3. A normally oxidisable organic material selected from the group consisting of hydrocarbons, aldehydes and cyclic ethers stabilised with 1-phenyl-5-methyl-pyrazoline.

4. A normally oxidisable organic material selected from the group consisting of hydrocarbons, aldehydes and cyclic ethers stabilised with 1-phenyl-pyrazolidine.

5. A normally oxidisable organic material selected from the group consisting of hydrocarbons, aldehydes and cyclic ethers stabilised with 1-phenyl-5-methyl-pyrazolidine.

6. A normally oxidisable organic material selected from the group consisting of hydrocarbons, aldehydes and cyclic ethers stabilised with 1-(4'-tert. butyl-phenyl)-pyrazoline.

References Cited in the file of this patent

UNITED STATES PATENTS

| 2,160,293 | Shoemaker et al. | May 30, 1939 |
| 2,454,075 | Mastin | Nov. 16, 1948 |
| 2,515,160 | Copenhaver | July 11, 1950 |

OTHER REFERENCES

Beilstein: Vierte Auflage, Handbuch der Organischen Chemie, vol. 23, page 29.